Figure 1:
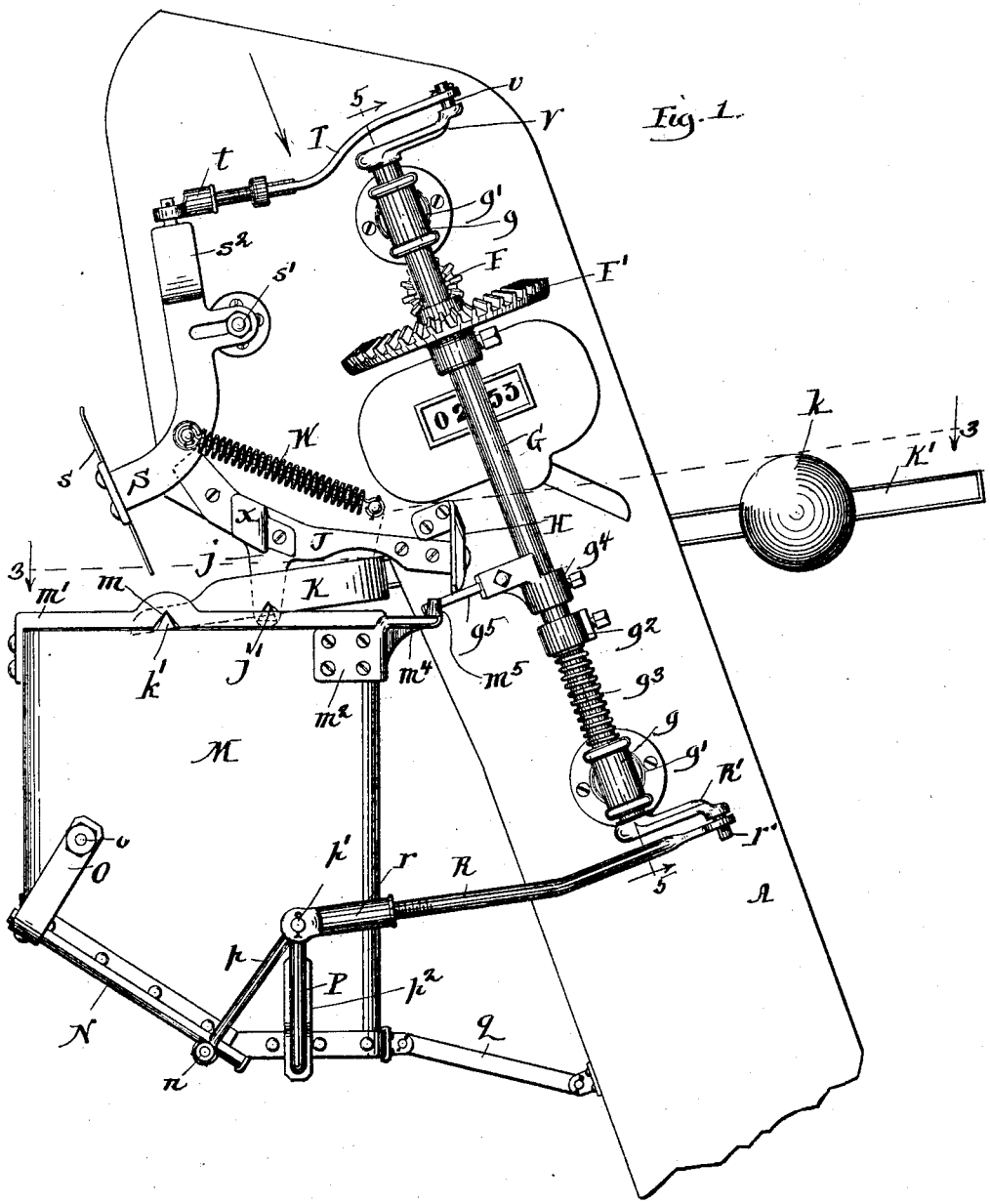

No. 625,971. Patented May 30, 1899.
C. L. GARDNER.
GRAIN WEIGHER.
(Application filed May 9, 1898.)
(No Model.) 4 Sheets—Sheet 1.

No. 625,971. Patented May 30, 1899.
C. L. GARDNER.
GRAIN WEIGHER.
(Application filed May 9, 1898.)
(No Model.) 4 Sheets—Sheet 2.
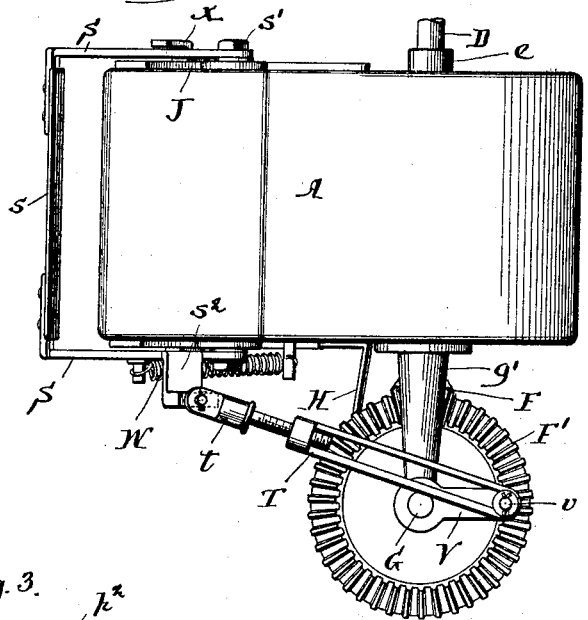
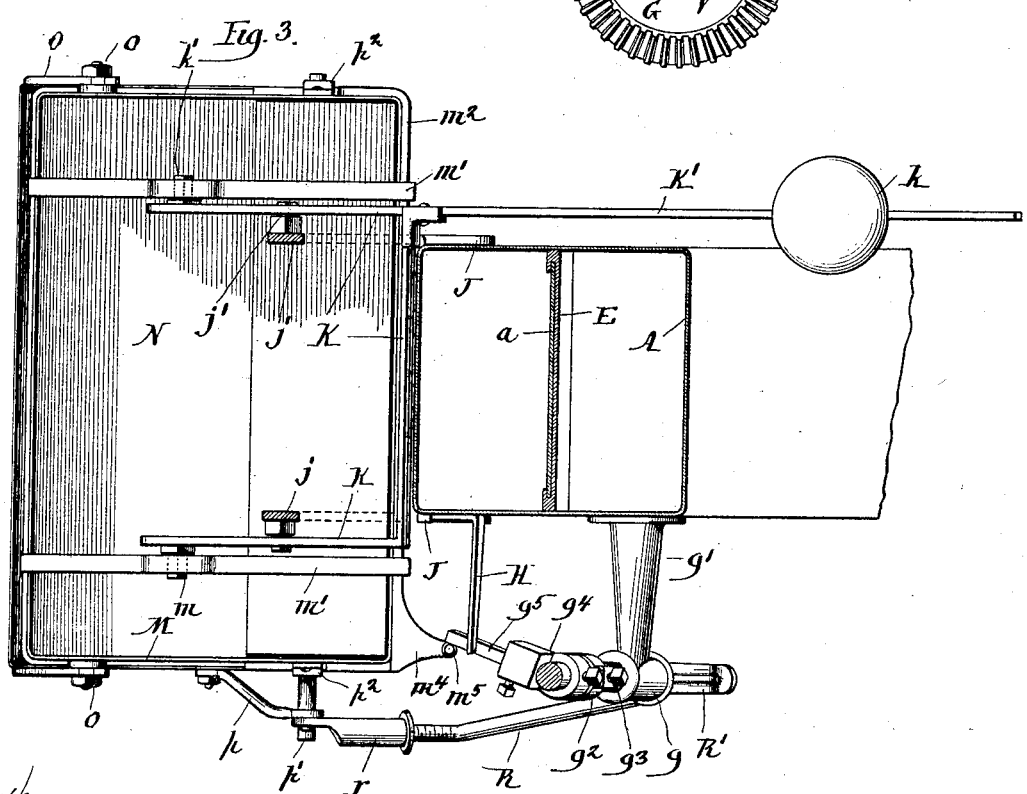
Witnesses: Inventor:
C. L. Gardner
Attorneys.
THE NORRIS PETERS CO., PHOTO-LITHO., WASHINGTON, D. C.

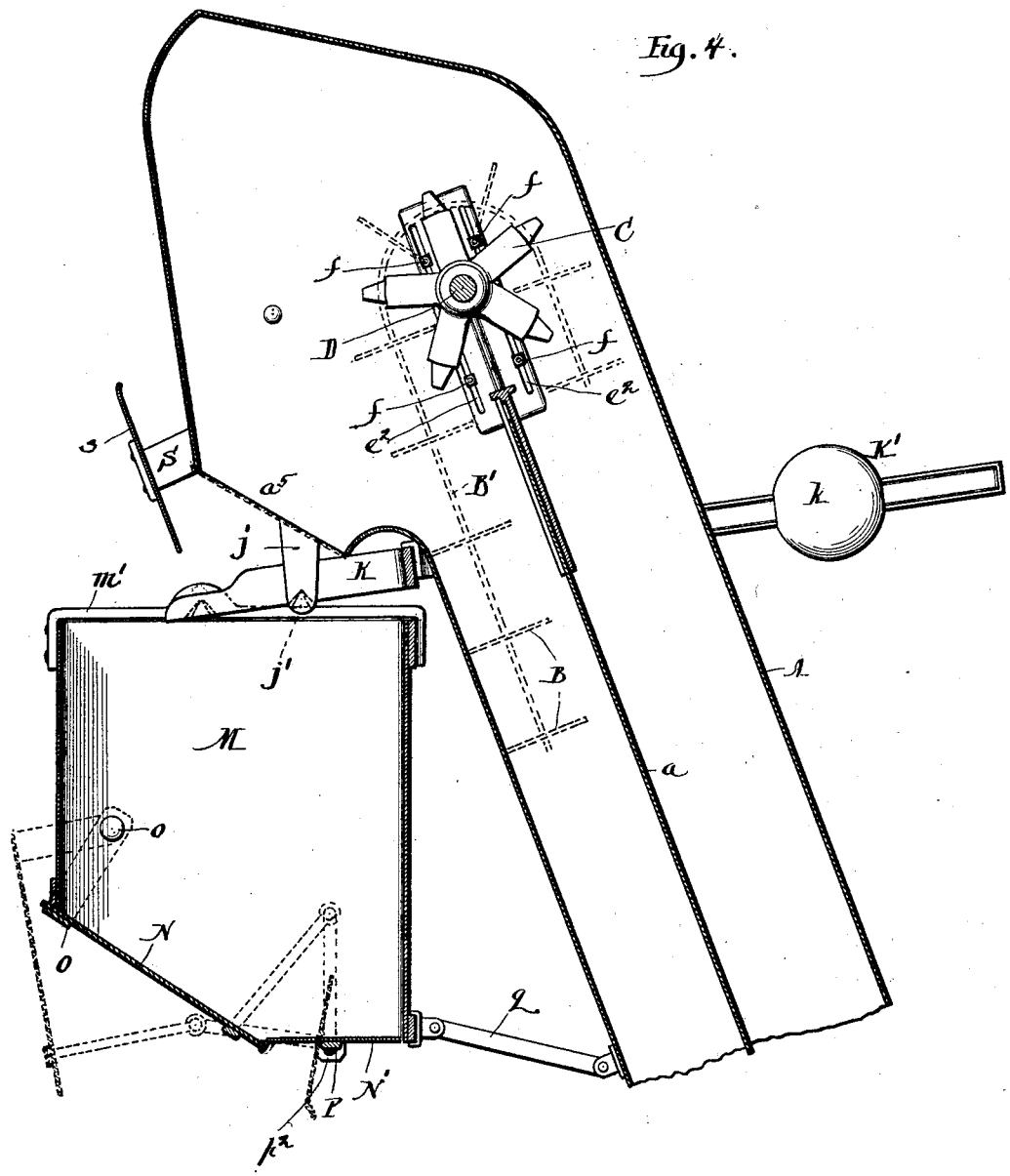

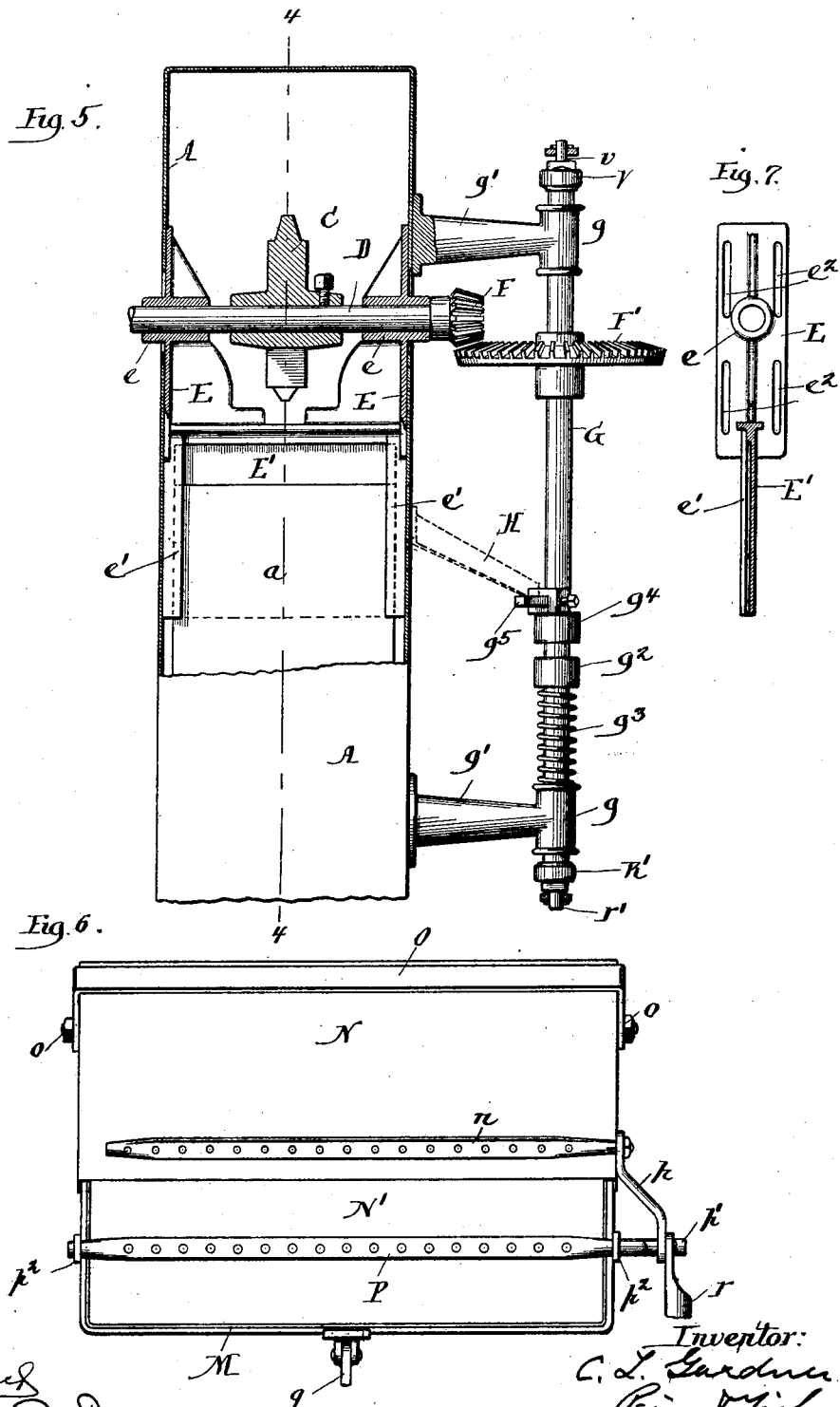

UNITED STATES PATENT OFFICE.

CHARLES L. GARDNER, OF RACINE, WISCONSIN, ASSIGNOR TO THE J. I. CASE THRESHING MACHINE COMPANY, OF SAME PLACE.

GRAIN-WEIGHER.

SPECIFICATION forming part of Letters Patent No. 625,971, dated May 30, 1899.

Application filed May 9, 1898. Serial No. 680,143. (No model.)

*To all whom it may concern:*

Be it known that I, CHARLES L. GARDNER, a resident of Racine, county of Racine, State of Wisconsin, have invented certain new and useful Improvements in Grain-Weighers and Conveyer Mechanism for Delivering Grain Thereto, of which I do declare the following to be a full, clear, and exact description.

The present invention has relation more particularly to that class of grain-weighers in which the grain is delivered from the spout of an elevator tube or trunk into a box or hopper suspended beneath the spout upon the frame of a scale-beam in such manner that when a predetermined amount of grain is delivered to the box or hopper it will descend a short distance and in so doing will bring into action the mechanism whereby the mouth of the elevator-spout is closed and whereby the bottom of the hopper is automatically opened in order to discharge the grain from the box or hopper into a wagon or other receptacle beneath it, the discharge of the grain from the box or hopper permitting the weight of the scale-beam to restore the parts to such position that a fresh supply of grain will be delivered from the elevator-spout to the box or hopper.

The invention consists in the various features of improvement hereinafter described, illustrated in the accompanying drawings, and particularly pointed out by claims at the end of this specification.

Figure 1 is a view in side elevation of the upper part of a grain-elevator having my invention applied thereto. Fig. 2 is a plan view looking in the direction of the arrow, Fig. 1. Fig. 3 is a view in horizontal section on line 3 3 of Fig. 1. Fig. 4 is a view in cross-section on line 4 4 of Fig. 5, the grain hopper or box being also shown in section. Fig. 5 is a view in vertical section on line 5 5 of Fig. 1. Fig. 6 is a detail inverted plan view of the grain box or hopper. Fig. 7 is a detail view of the journal-frame for the upper conveyer-shaft and parts connected therewith.

A designates the elevator-tube, that is divided by a partition $a$ into vertical compartments wherein travel the conveyer flights or disks B, that are carried by the usual chain or belt B', that passes around a sprocket-wheel C, journaled upon a shaft D in the upper part of the elevator A. The shaft D is mounted in suitable bearings $e$ in the journal-frame sustained within the upper end of the conveyer, this frame comprising side plates E, connected together by a plate or diaphragm E'. The plates E, the box $e$, and the plate or diaphragm E' are preferably formed as a single casting, and at the edges of the plate or diaphragm E' are formed the grooved or recessed guideways $e'$, that receive the side edges of the partition-plate $a$. (See Figs. 3 and 5.) The shaft D passes through elongated openings formed in the side walls of the conveyer-tube A, and the plates E are held in position by means of bolts $f$, that pass through slots $e^2$ formed in the plates E. By means of the bolts and slots the plates E and the plate or diaphragm E' can be simultaneously adjusted with the shaft D and sprocket-wheel C without the necessity of leaving any open space at the top of the partition-plate $a$, since as the sprocket-wheel C and shaft D are elevated the plate or diaphragm E' is moved upward in unison therewith, and thus maintains a constant relation with respect to the sprocket-wheel.

Upon one end of shaft D is mounted a bevel-pinion F, which revolves constantly with shaft D. Beneath bevel-pinion F is bevel gear-wheel F', fastened by set-screw to shaft G, journaled in boxes $g$ at the ends of bracket-arms $g'$. The shaft G is mounted to slide within box $g$, and upon this shaft is fixed collar $g^2$, between which and the lower box $g$ a coil-spring $g^3$ is interposed, that encircles shaft G. The coil-spring raises the shaft G and throws bevel gear-wheel F' at intervals into engagement with bevel-pinion F. Upon shaft G a sleeve $g^4$ is fixed, from which projects a releasing-arm $g^5$. During part of the revolution of shaft G said arm $g^5$ will ride against the lower edge of inclined bar or cam-plate H, bolted to and projecting from one side of elevator-tube A. Arm $g^5$ is set at such position that as shaft G rotates said arm will ride against the lower edge of the bar or cam H, thereby forcing the shaft G downward and withdrawing the bevel gear-wheel F' from engagement with the bevel-pinion F.

Upon the sides of the conveyer-tube A, adjacent its discharge-spout $a^5$, are fastened the bars or brackets J, the depending arms $j$ of which are formed with knife-edge offsets $j'$, whereon rests the frame or yoke K of the scale-beam K', this scale-beam K' being graduated and being furnished with a suitable weight $k$ in usual manner. The outer ends of the yoke or frame K are provided with knife-edge offsets $k'$, that enter corresponding seats $m$ in the bars $m'$, which extend across the top of the grain box or hopper M, the ends of the bars $m'$ being bolted at the front to the upper edge of the box or hopper and at the back to a bar or frame $m^2$, that extends along its upper inner edge, the ends of the bar or frame $m^2$ being bolted to the hopper, as clearly seen in Fig. 1 of the drawings. The bottom of the box or hopper M is closed by the gates N and N'. The gate N is sustained at its front edge by a yoke or bar O, the upturned ends of which are pivoted, as at $o$, to the sides of the box or hopper M. Beneath the lower portion of the gate N extends a bar $n$, to the outer end of which is pivotally connected a link $p$, the upper end of this link being pivotally mounted on the outwardly-bent upper end $p'$ of a rocking bar P, that is journaled in plates or brackets $p^2$, depending beneath the bottom of the box or hopper M at each side thereof. The rear bottom edge of the box or hopper M is connected by a pivot-link $q$ with the elevator-tube A, as clearly seen in Figs. 1 and 4 of the drawings. To the bent end $p'$ of the rocking bar P one end of the connecting-rod R is pivotally connected by means of the coupling $r$, that is perforated to receive the bent end $p'$ of the arm P and is formed with a threaded socket to receive the correspondingly-threaded end of the rod R. The rear end of the rod R is perforated to engage a wrist-pin $r'$, that projects from a crank-arm R', that is fastened to the lower end of the shaft G. At the upper rear edge of the box or hopper M, and preferably formed as part of the frame $m^2$, is a bracket $m^4$, provided with a stud $m^5$, adapted at the proper time to contact with the releasing-arm $g^5$ and arrest its rotation, as will presently more fully appear.

The spout $a^5$ of the elevator-tube A is adapted to be closed during the discharge of the grain from the box or hopper M by a gate $s$, that is fixed to a yoke or frame S, the arms of which are pivoted, as at $s'$, to the side walls of the elevator tube or trunk. The upper end of one of the arms of the yoke or frame S is bent outwardly, as at $s^2$, and has pivotally connected thereto by an adjustable coupling $t$ a slotted arm T, the slot of this arm T serving to receive the wrist-pin $v$ of a crank-arm V, that is fixed to the upper end of the shaft G. Preferably the frame or yoke S is pivoted, as at $s'$, in such manner that the frame may be adjusted upon its pivot-points, although this is not essential. To the frame or yoke S is connected one end of a coil-spring W, the opposite end of this spring being attached to the side of the elevator-tube, so that the spring shall have a tendency to rock the frame S about the pivot-points and in so doing to draw forward the slotted arm $t$, and thus impart an initial movement to the shaft G. To the arms or brackets J, that are arranged at the sides of the discharge-spout $a^5$, are fixed stop-plates $x$, that serve to limit the inward-swinging movement of the yoke or frame S.

From the foregoing description the operation of the mechanism will be seen to be as follows, it being assumed that the parts at the outset are in the normal position shown in the drawings. With the parts in such position the shaft G will be held downward against the force of the coil-spring $g^3$ by reason of the engagement of the releasing-arm $g^5$ with the lower edge of the inclined plate or arm H, and at such time also the stop $m^5$ will engage with the arm $g^5$ and prevent the coil-spring W from rocking the yoke or frame S, and consequently from imparting movement to the shaft G. When, however, sufficient grain has been delivered from the spout $a^5$ into the box or hopper M to overcome the weight $k$, the box or hopper M will move downward until the stop $m^5$ at its upper rear edge passes from engagement with the releasing-arm $g^5$. The coil-spring W will then rock the frame S, thereby causing the arm T to impart an initial movement to the shaft G sufficient to cause the releasing-arm $g^5$ to pass from beneath the inclined bar or cam H, whereupon the coil-spring $g^3$ will force upward the shaft G and cause the beveled gear-wheel F' to engage with the constantly-revolving beveled pinion F. Revolution will then be imparted from the pinion F and gear-wheel F' to the shaft G and by this shaft to the crank-arms V and R' at its upper and lower ends. The crank-arm V will, through the medium of the slotted arm T and the pivoted frame or yoke S, cause the gate $s$ to promptly close the discharge-spout $a^5$, while the crank-arm R' will, through the medium of the rod R, the rocking arm P, and the links $p$, move the gates N and N', that normally close the bottom of the box or hopper M, from the position seen in full lines to the position shown by dotted lines in Fig. 4 of the drawings. Hence it will be seen that the delivery of grain from the spout $a^5$ will be temporarily checked while the discharge of the grain from the box or hopper M is effected. As the shaft G completes its revolution the releasing-arm $g^5$ will ride against the lower edge of the inclined bar or cam H and will be forced downward thereby, carrying with it the shaft G, and thus releasing the gear-wheel F' from engagement with the beveled pinion F. During the latter part of the revolution of the shaft the crank-arm R' will restore the gates N and N' to the position shown by full lines in Fig. 4, and this will occur before the crank-arm V has again opened the gate s of the delivery-spout $a^5$, because the long slot of the arm T permits the crank V to approximately complete its movement before it serves to shift the rod T, and thus rock the frame or yoke S. After the grain has been discharged from the box or hopper M and the latter has been raised by the weight K to normal position the stop $m^5$ will be in place to engage the releasing-arm $g^5$ as the latter moves downward along the bottom edge of the inclined bar or cam H.

It is manifest that the precise details of construction above set out may be varied without departing from the spirit of the invention and that features of the invention may be employed without its adoption as an entirety.

Having thus described my invention, what I claim as new, and desire to secure by Letters Patent, is—

1. In apparatus of the character described, the combination with the elevator-tube and with the grain box or hopper, of two gates for closing the bottom of said box or hopper, one of said gates extending partially across the bottom of said box and being provided with hangers whereby it may be swung in upward and outward direction, and the other of said gates being pivotally mounted beneath the bottom of said box and closing the space between the side wall of the box and the inner end of the swinging gate and means connected to said gates for simultaneously effecting the pivotal movement of one gate and the swinging movement of the other gate from the conveyer-shaft.

2. In apparatus of the character described, the combination with the grain box or hopper, of two gates for closing the bottom of said box or hopper, one of said gates being provided with suitable hangers whereby it may be swung away from the bottom of the box and the other of said gates being pivotally mounted, a rocking arm connected with both of said gates for opening and closing the same and suitable mechanism for intermittently actuating said rocking arm.

3. In apparatus of the character described the combination with the elevator-tube and with the grain box or hopper and with suitable gates for closing the delivery-spout at the elevator-tube and the bottom of said box or hopper, of mechanism for intermittently actuating said gates comprising a shaft extending at one side of the elevator-tube and provided at its upper and lower ends with crank-arms whereby said cranks are actuated, a gear-wheel upon said shaft and a gear-wheel connected with the conveyer-shaft and means for bodily shifting one of said gear-wheels to disengage it from the other.

4. In apparatus of the character described, the combination with the elevator-tube and with the grain box or hopper and its gate mechanism, of means for operating said gate mechanism comprising a shaft extending lengthwise of the elevator-tube at one side thereof, said shaft being mounted in manner permitting it to slide in its box, a gear-wheel on said shaft adapted to engage with a gear-wheel driven by the conveyer-shaft, a spring for holding said sliding shaft in normal position to insure the engagement of said gear-wheels and suitable means for shifting said shaft to disengage said gear-wheels.

5. In apparatus of the character described, the combination with the elevator-tube and with the grain box or hopper, of gate mechanism for closing the bottom of said box or hopper and means for actuating said gate mechanism, comprising an intermittently-operated shaft arranged at one side of the elevator-tube and extending lengthwise thereof, the lower end of said shaft being suitably connected with the gate mechanism, a gear-wheel mounted upon said shaft and movable bodily at right angles to its plane of revolution, a gear-wheel on the conveyer-shaft and suitable mechanism whereby said gear-wheels are intermittently thrown into and out of engagement.

6. In apparatus of the character described, the combination with the elevator-tube and with the grain box or hopper and its gate mechanism, of means for operating said gate mechanism comprising a shaft extending lengthwise of the elevator-tube at one side thereof, a gear-wheel on said shaft adapted to engage with a gear-wheel on the conveyer-shaft, a spring for forcing said gear-wheels into engagement with each other, a releasing-arm mounted upon said shaft and an inclined bar or plate adapted to engage said releasing-arm in order to effect the disengagement of the gear-wheels.

7. In apparatus of the character described, the combination with the elevator-tube, and with the grain box or hopper and with the scale-beam frame whereby said box is supported, of gates for closing the delivery-spout of the elevator-tube and the bottom of the grain box or hopper and mechanism for operating said gates comprising a shaft extending lengthwise of the elevator-tube at one side thereof, a beveled gear-wheel on said shaft adapted to engage with the beveled pinion on the conveyer-shaft, a spring for forcing said gear-wheel and pinion into engagement, a releasing-arm mounted upon said shaft, an inclined bar or plate adapted to engage said releasing-arm in order to effect the disengagement of the gear-wheel and pinion and a stop carried by the grain-box and serving also to engage said releasing-arm.

8. In apparatus of the character described, the combination with the elevator-tube and with the grain box or hopper and with suitable gates for closing the delivery-spout of the elevator-tube and the bottom of the grain box or hopper, of mechanism for operating said gates, comprising an intermittently-actuated shaft arranged at one side of the elevator-tube and provided at its ends with crank-arms suitably connected with said gates, means for throwing said shaft out of action and a spring for imparting an initial partial revolution to said shaft.

CHARLES L. GARDNER.

Witnesses:
PHILIP M. WACKUHAGEN,
WILLARD J. KLING.